(12) United States Patent
Draganov et al.

(10) Patent No.: US 7,728,766 B2
(45) Date of Patent: Jun. 1, 2010

(54) OPTIMIZED BEAMFORMING FOR SATELLITE COMMUNICATION

(75) Inventors: Alexandr Draganov, Reston, VA (US); Aaron Weinberg, Potomac, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1098 days.

(21) Appl. No.: 11/392,827

(22) Filed: Mar. 30, 2006

(65) Prior Publication Data

US 2007/0232227 A1    Oct. 4, 2007

(51) Int. Cl.
H04B 7/185    (2006.01)

(52) U.S. Cl. ...................................... 342/354

(58) Field of Classification Search ......... 342/352–354; 455/12.1, 13.3, 427–429, 12.01; 701/13
See application file for complete search history.

(56) References Cited

U.S. PATENT DOCUMENTS

| | | | |
|---|---|---|---|
| 4,135,156 A | 1/1979 | Sanders, Jr. et al. | |
| 5,917,446 A * | 6/1999 | Greenspan | 342/373 |
| 6,687,492 B1 | 2/2004 | Sugar et al. | |
| 7,260,141 B2 | 8/2007 | Bierly et al. | |
| 2004/0259497 A1 | 12/2004 | Dent | |
| 2006/0292990 A1* | 12/2006 | Karabinis et al. | 455/63.4 |

OTHER PUBLICATIONS

PCT International Search Report and Written Opinion in counterpart International Application No. PCT/US07/64528, dated Dec. 21, 2007.

Peter D. Karabinis et al., "Interference Potential to MSS due to Terrestrial Reuse of Satellite Band Frequencies", 2005, Mobile Satellite Ventures, LP. Published by the Istituto Internazionale delle Comunicazioni, Genoa, Italy.

* cited by examiner

Primary Examiner—Thomas H Tarcza
Assistant Examiner—Nga X Nguyen
(74) Attorney, Agent, or Firm—Edell, Shapiro & Finnan, LLC

(57) ABSTRACT

A method for determining beamforming weights used onboard a satellite and ground-based beamforming weights used in a ground-based station as part of a satellite communication system. This beamforming method is a two-stage beamforming process that requires a reduced downlink bandwidth between the satellite and the ground-based station yet achieves optimal signal-to-noise ratio for bandwidth allocated for the downlink. values for the fixed onboard beamforming weights are computed to yield a maximum, $$\max_A \left( \min_U \frac{S}{N} \bigg|_{W=\breve{W}} \right),$$

where the maximum is computed over all possible fixed weights A represented by an L×M matrix, the minimum is computed over all possible positions of remote communication devices U, and the signal-to-noise ratio (S/N) is computed for the optimal set of ground-based beamforming weights $W=\breve{W}$.

9 Claims, 6 Drawing Sheets

OPTIMIZED BEAMFORMING FOR SATELLITE COMMUNICATION

FIELD OF THE INVENTION

The present invention relates to satellite communication systems, and more particularly to a method for computing beamforming weights that optimize communication between a satellite and remote communication devices.

BACKGROUND OF THE INVENTION

Modern telecommunication satellites use antenna arrays and beamforming techniques to improve the link quality. The antenna array comprises multiple antenna elements. A signal from a remote communication device (terrestrial-based or airborne-based) is detected at each of these elements and the resulting signals are linearly (weighted and) combined to achieve the optimum performance for a link between the satellite and the remote communication device. The beamforming weights take into account the position of the user, the position of the satellite, calibration data for the antenna elements, satellite attitude, etc. The remote communication device is often referred to as a "user".

When the user and/or the satellite are moving, the optimal beamforming weights vary in time, and must be recomputed with some periodicity to stay current with the position of the user with respect to the satellite. The beamforming weights also must be recomputed for each new user. If a satellite serves multiple, dynamic (moving) users, the required electronic circuitry and the computational burden become a serious obstacle in performing satellite beamforming onboard. This resulted in the introduction of the ground-based beamforming.

In a ground-based beamforming (GBBF) system, signals from the antenna elements of the satellite are transmitted over downlink channels to a ground-based terminal (gateway), and then subsequently combined to ensure a quality link to each user. Ground-based beamforming is virtually free from the resource limitations of the satellite onboard beamforming; however, it faces limitations of a different kind. Transmission of signals from multiple antenna elements requires a significant amount of bandwidth between the satellite and the gateway.

An amalgamation of these two methods forms some number of antenna beams onboard, and transmits the resulting signals to the ground-based gateway, where they are further combined to form one beam for each user. In this method, the onboard beamforming involves the use of fixed, pre-computed weights, which relieves the onboard satellite systems of all the computations required to form beams for multiple, dynamic users. The number of beams formed by the satellite is smaller than the number of antenna elements. This relaxes the bandwidth requirements for the downlink channels to the gateway. Thus, a combination of the onboard beamforming and ground-based beamforming produces a compromise, which may be suitable for some applications.

At one bandwidth extreme, if signals from all of the elements are downlinked to the ground-base gateway, the ground-based beamforming will have enough flexibility to achieve maximum performance for each user. The downside of this approach is that a substantial amount of bandwidth is required to downlink a large number of signals. At the opposite extreme, if the onboard beamforming forms and downlinks just a few signals, the required bandwidth is low, but the ground-based beamforming may not achieve acceptable quality. What is needed is a technique for selecting a compromise configuration that has moderate bandwidth requirements and achieves an acceptable link quality.

SUMMARY OF THE INVENTION

Briefly, a method is provided for determining beamforming weights used onboard a satellite and ground-based beamforming weights used in a ground-based station as part of a satellite communication system. This beamforming method is a two-stage beamforming process that uses a reduced downlink bandwidth between the satellite and the ground-based station yet achieves optimal signal-to-noise ratio for the bandwidth allocated for the downlink. The satellite has an antenna array having M plurality of antenna elements. The antenna array detects a signal transmitted from any one or more of a plurality of remote communication devices in the field of view of the satellite and produces M plurality of receive signals. A set of fixed (onboard) beamforming weights are applied to the M plurality of receive signals to produce L plurality of weighted signals, where L is less than M. The satellite transmits the L plurality of weighted signals on corresponding ones of L downlink channels to the ground-based station.

At the ground-based station, the plurality of L downlink channel signals are received and position-dependent ground-based beamforming weights are applied to them. The weighted downlink channel signals are then combined to produce a beamformed receive signal corresponding to the signal received at the satellite for each of the plurality of remote communication devices. For any position of a remote communication device with respect to the satellite, the ground-based beamforming weights are set to values that maximize a signal-to-noise ratio of the beamformed receive signal and the fixed onboard beamforming weights are selected to maximize a minimum signal-to-noise ratio of the received beamformed signal with respect to position of a remote communication device. More specifically, values for the fixed onboard beamforming weights are computed to yield a maximum, $$\max_{A}\left(\min_{U}\frac{S}{N}\bigg|_{W=\tilde{W}}\right),$$

where the maximum is computed over all possible fixed weights A represented by an L×M matrix, the minimum is computed over all possible positions of remote communication devices U, and the signal-to-noise ratio (S/N) is computed for the optimal set of ground-based beamforming weights W=W̃.

DETAILED DESCRIPTION

Figure 1:
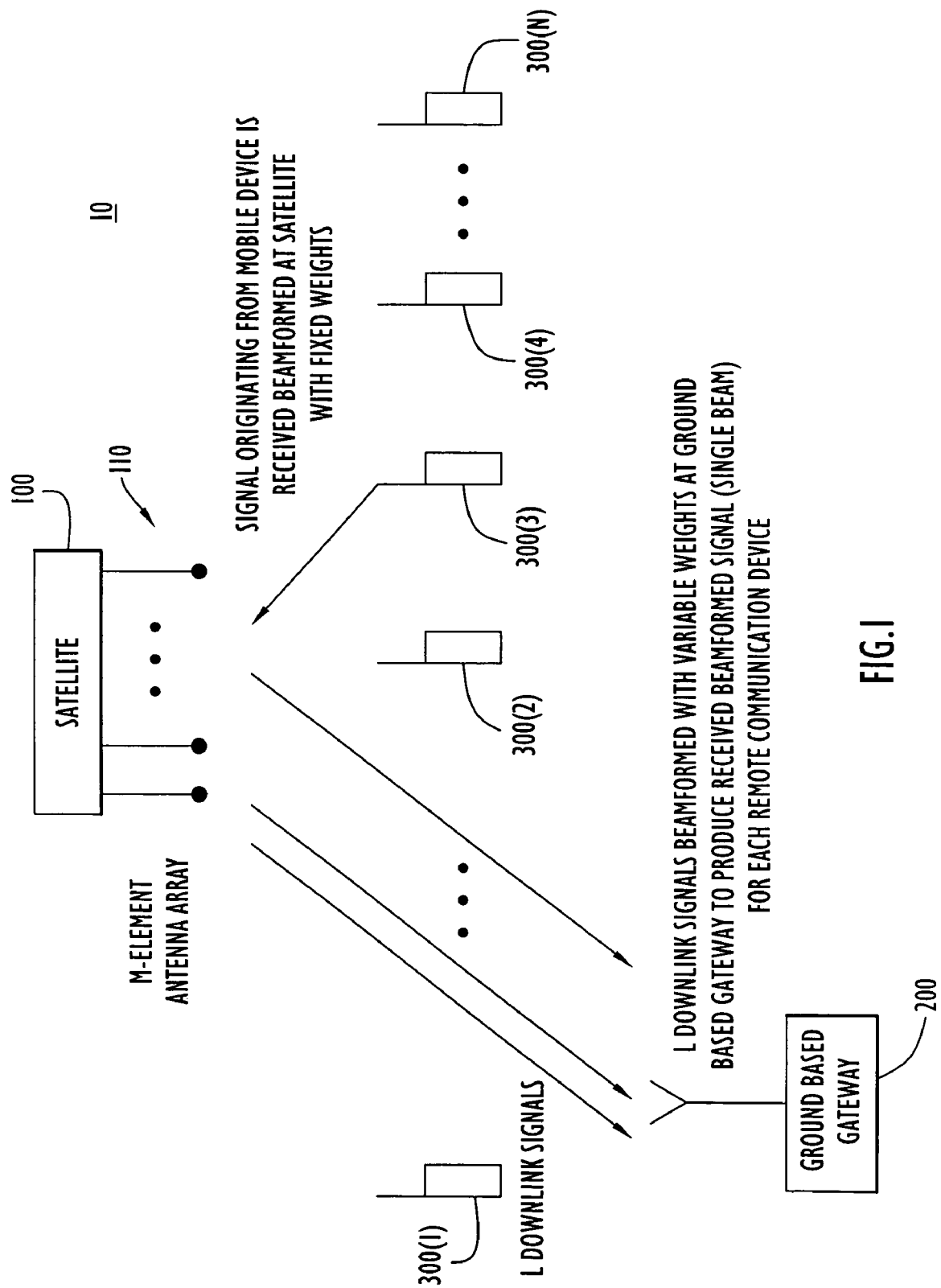
FIG. 1 is a block of the satellite communication system and method according to the present invention.
Figure 2:
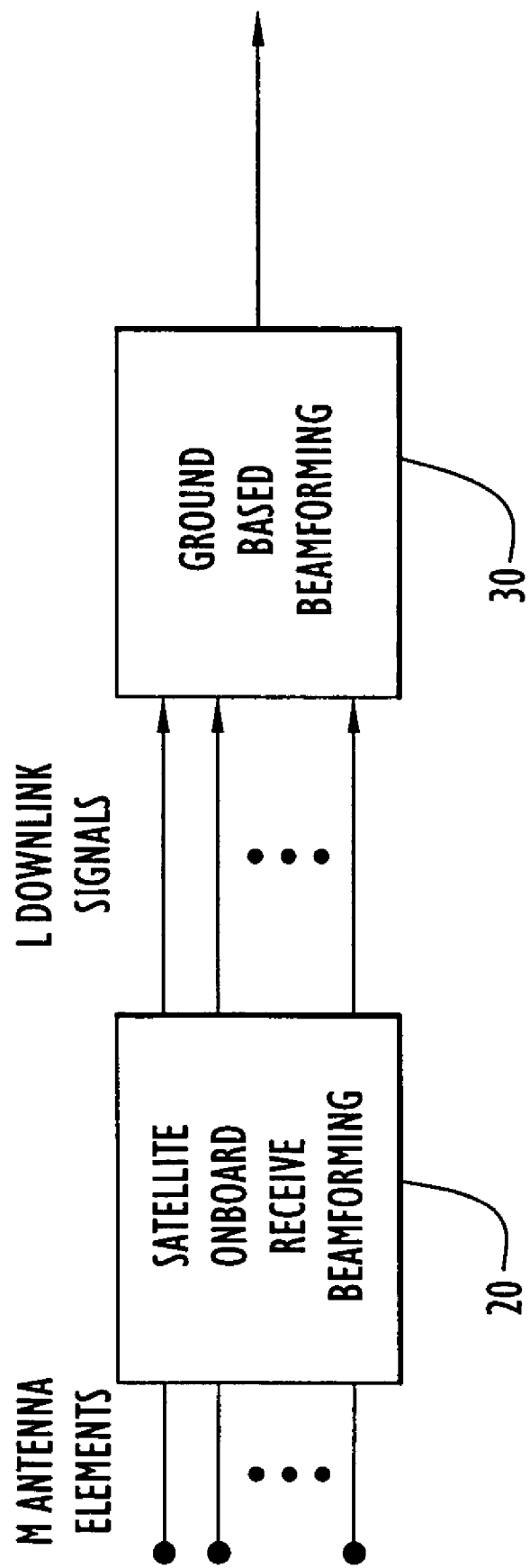
FIG. 2 is a flow diagram showing how the system and method according to the present invention require a reduced bandwidth for the downlink signals.

With reference to FIGS. 1 and 2, the satellite communication system 10 according to the present invention will be described. Specifically, a satellite 100 communicates with each of a plurality of remote communication devices (users) 300(1) to 300(N). The remote communication devices 300(1) to 300(N) may include a wireless telephone device, or other communication device, terrestrial or airborne based. The satellite 100 has an M-element antenna array 110 and each element of the array receives a signal transmitted by a remote communication device. In addition, the satellite 100 transmits signals on downlink channels to a ground-based gateway device 200.

The satellite 100 detects at each of the M plurality of antenna elements the signal transmitted to it from one of the remote communication devices 300(1) to 300(N), thereby producing M plurality of receive signals. The satellite 100 includes sufficient processing or computing capabilities to apply a set of fixed onboard beamforming weights to the M plurality of receive signals to produce L (reduced) number of plurality of weighted signals, where L is less than M. The satellite transmits the L plurality of signals on each of a corresponding one of L plurality of downlink channels to the ground-based gateway 200. The ground-based gateway device 200 receives the L downlink signals and applies a set of variable (user-dependent and position-dependent) beamforming weights to produce a received beamformed signal (single beam) for each remote communication device corresponding to the L weighted signals produced at the satellite 100.

According to the present invention, the fixed onboard beamforming weights used by the satellite 100 and the variable user position-dependent ground-based beamforming (GBBF) weights used by the ground-based gateway unit 200 are computed so as to ensure optimal service to users in some area subject to a reduced downlink channel bandwidth. Thus, as shown in FIG. 2, this is a two-stage beamforming process comprising satellite onboard receive beamforming at 20 to produce L plurality of weighted signals that are then sent via corresponding ones of L downlink channels to a ground-based station that performs ground-based beamforming at 30 on the L downlink channel signals to produce a beamformed receive signal for each signal detected by the satellite antenna array and transmitted from one of the plurality of remote communication devices. The satellite 100 combines the M signals from its M individual antenna elements into L beams (L<M) using fixed beamforming weights. The resulting L signals are downlinked to the ground-based station 200, were they are further combined into one beam for each user. Moreover, the present invention presents a technique that involves a tradeoff between the link quality and the required downlink bandwidth.

The beamforming weights on the satellite 100 are fixed during operation, and the beamforming weights at the ground-based station are dynamically adjusted depending on a particular user and the user's position (angle) with respect to the satellite 100. In order for the satellite 100 to serve several users, the onboard beamforming weights need to be selected in such way, that they (in a combination with the GBBF weights) are suitable for any user location within the region of interest (e.g., a cone in the nadir direction) with respect to the satellite. The GBBF weights are applied to the downlink signals and can "customize" the total effect of the two-stage beamforming for each user.

Figure 3:
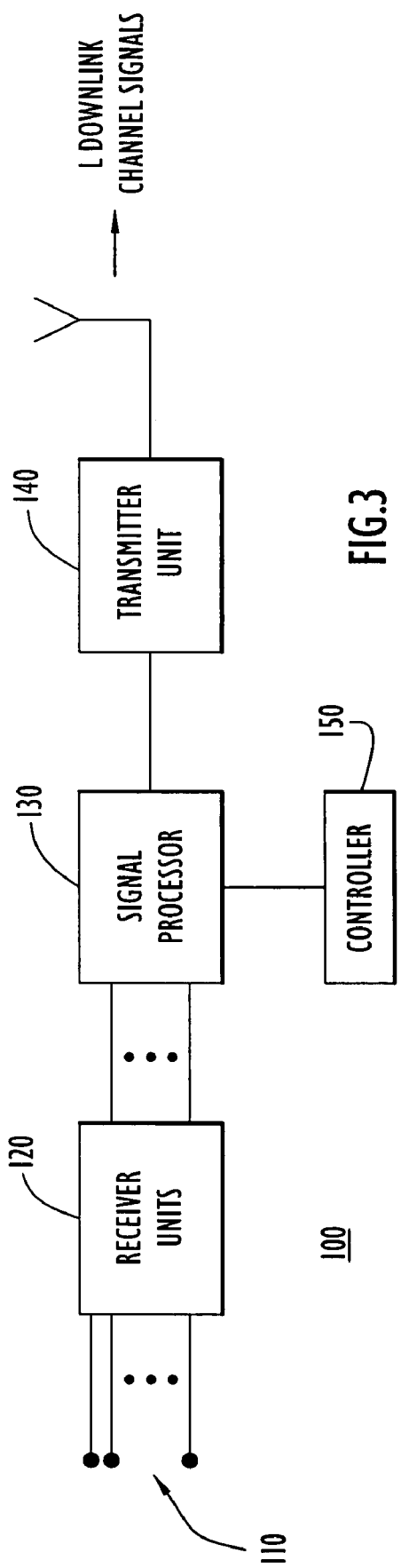
FIG. 3 is a block diagram of a satellite useful in accordance with an embodiment of the present invention.

Turning next to FIG. 3, an exemplary block diagram of the satellite 100 is shown. There is a block of receiver units, shown generally at reference numeral 120, associated with corresponding ones of the antenna elements in the array 110. The receiver units produce M plurality of receive signals based on the detection of a signal transmitted from a remote communication device at each of the M plurality of antenna in the array 110. The receiver units 120 are connected to a signal processor unit 130. The signal processor unit 130 may include analog hardware, digital hardware and/or a microprocessor that acts on software stored in a memory. Under control of a controller 150 (which again may be a software-operated microprocessor), the signal processor unit 130 applies a set of fixed beamforming weights to the M plurality of receive beamforming signals to produce L plurality of weighted signals. A transmitter unit 140 is connected to the signal processor unit 130 and, under control of the controller 150, transmits L downlink signals representing the L plurality of weighted signals to the ground-based gateway or station 200.

Figure 4:
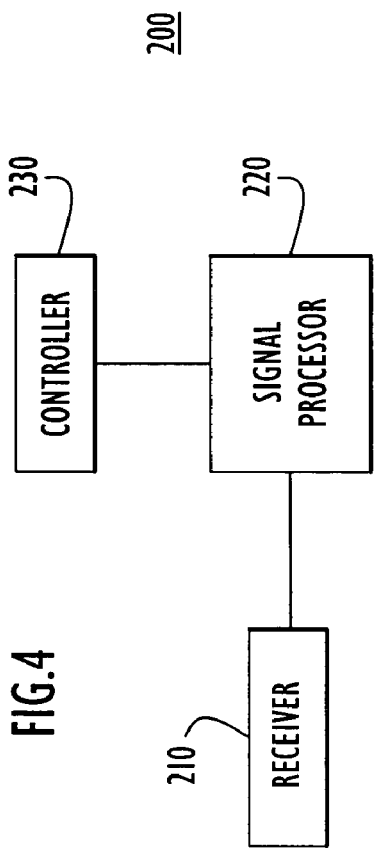
FIG. 4 is a block diagram of a ground-based station in accordance with an embodiment of the present invention.

Moving to FIG. 4, an exemplary block diagram of the ground-based gateway 200 is shown. The gateway 200 comprises a receiver 210 that receives the L downlink channel signals from the satellite. The receiver 210 is connected to a signal processor unit 220. Under control of the controller 230, the signal processor unit 220 applies user-dependent (and user position-dependent) ground-based beamforming weights to the L downlink channel signals and combines the resulting weighted signals to produce a beamformed receive signal corresponding to the signal that was transmitted to the satellite by a remote communication device.

The beamforming weights are optimized using the following criterion:

For a user located anywhere in the region of interest, the optimal GBBF weights are computed to maximize the signal-to-noise (S/N) ratio. This procedure defines S/N as a function of the onboard beamforming weights and of the user location (note that this function does not depend on GBBF weights since they are set to optimal values for each case). The onboard weights are selected in such a way that the minimum value of this function with respect to user location is maximized. Mathematically, the set of onboard weights are found that yield the following maximum:

$$\max_{A}\left(\min_{U}\frac{S}{N}\bigg|_{W=\breve{W}}\right) \tag{1}$$

where the maximum is computed over all possible onboard weights A, the minimum is computed over all possible user locations U, and the signal-to-noise ratio is computed for the optimal set of GBBF weights $W=\breve{W}$.

The following describes a technique for finding the optimal GBBF weights for a given set of onboard weights.

Optimal GBBF Weights

Nominal Case

At the input to the ground-based beamforming computation, there is an L-vector $\vec{y}+\vec{N}$ of signal and correlated noise. The goal is to find the weights $\vec{W}$ that maximize the signal-to-noise (S/N) ratio:

$$\frac{|S|^2}{|N|^2} = \frac{\sum_{j,k} W_j W_k^* y_j y_k^*}{\sum_{j,k} W_j W_k^* \overline{N_j N_k^*}} \quad (2.1)$$

where the horizontal bar denotes the mathematical expectation. The maximum of this value is found by requiring $$\frac{\partial}{\partial W_j}\left(\frac{|S|^2}{|N|^2}\right) = 0 \quad (2.2)$$

After computing the derivative, a system of L equations results; the j-th equation is as follows:

$$y_j \sum_{i,k} W_i W_k^* \sigma_{ik} - \sum_i W_i y_i \cdot \sum_k W_k^* \sigma_{jk} = 0 \quad (2.3)$$

where the notation $\sigma_{ik} = \overline{N_i N_k^*}$. Matrix $\sigma_{ik}$ is Hermithian and positive-definite. The noise variables are correlated, which means that $\sigma_{ik}$ is not diagonal (as if it would be in the case of non-correlated noise).

This system of equations is solved for $W_j$. It has an important feature: if $W_j$ is a solution, then const·$W_j$ is also a solution (the system is homogeneous). This feature is exploited as described hereinafter.

Solving for $$\sum_k W_k^* \sigma_{ik}$$

and computing the complex conjugate of the result yields the following:

$$\sum_k \sigma_{jk}^* W_k = C \cdot y_j^* \quad (2.4)$$

where $$C = \frac{\sum_{i,k} W_k W_i^* \sigma_{ik}^*}{\sum_i W_i^* y_i^*} \quad (2.5)$$

The important fact is that C does not depend on j. This means that C is a scaling factor, and (in view of the homogeneity of the system of equations) can be set to any fixed value, e.g. to 1. This selects one solution of the system of equations represented by equation (2.3); all other solutions can be obtained by scaling this one solution. With this consideration, the system of equations for $W_j$ becomes linear:

$$\sum_k \sigma_{jk}^* W_k = y_j^* \quad (2.6)$$

Its solution is trivial:

$$\vec{\breve{W}}^* = \hat{\sigma}^{-1} \cdot \vec{y} \quad (2.7)$$

where a hat denotes a matrix. The result can be used in (2.1) to compute the optimal signal-to-noise ratio. Substitution of the solution for $W_k^*$ in the denominator of (2.1) yields:

$$\frac{|S|^2}{|N|^2} = \frac{\sum_{j,k} \breve{W}_j \breve{W}_k^* y_j y_k^*}{\sum_j \breve{W}_j y_j} = \sum_k \breve{W}_k^* y_k^* = \vec{y}\hat{\sigma}^{-1}\vec{y} \quad (2.8)$$

Both the signal $\vec{y}$ and the covariance noise matrix $\hat{\sigma}$ depend on the onboard weights. It is necessary to compute $\vec{y}$ and $\hat{\sigma}$ for any set of onboard weights and for any user position or location. The computation of equation (2.8) becomes relatively easy. The only non-trivial operation is the inversion of an L×L matrix, but there are several very good methods for inverting positive-definite matrices (e.g., LUD decomposition) if the matrix is non-singular and is not close to a singular one.

To reiterate: the final goal is to find the minimum of $$\frac{|S|^2}{|N|^2}$$

over locations of the user, and then the maximum of the result over onboard beamforming weights.

Any maximum-finding algorithm successively tries multiple values of the arguments (in this case, onboard beamforming weights) to find a maximum of the goal function. At each step, the goal function computes the optimum ground-based beamforming weights and the optimal S/N ratio by applying the above formulas. Over the course of numerous matrix computations, this procedure is bound to produce some singular or nearly singular matrices $\hat{\sigma}$, which cannot be reliably inverted for use in equation (2.8). Thus, the straightforward algorithm described above needs to be patched to account for having a singularity (or almost singularity) in matrix $\hat{\sigma}$. The following describes an algorithm for dealing with this essential, albeit not nominal case.

A Case of a Singular Matrix

A singularity occurs when one or more of matrix eigenvalues is zero. This means that a linear operator associated with matrix $\hat{\sigma}$ has the following properties:

For non-zero vectors $\vec{W}$ from some subspace, vector $\hat{\sigma}\vec{W}$ is non-zero, i.e. $\hat{\sigma}\vec{W} \neq 0$ For non-zero vectors $\vec{W}$ from a complementary subspace, vector $\hat{\sigma}\vec{W}$ is zero, i.e. $\hat{\sigma}\vec{W}=0$ Thus, a general solution for $\vec{W}$ of the system of equations (2.6) comprises two terms:
   An inverse of operator $\hat{\sigma}$ in the subspace, where this inverse is defined, plus
   An arbitrary vector in the complementary subspace.

Figure 5:
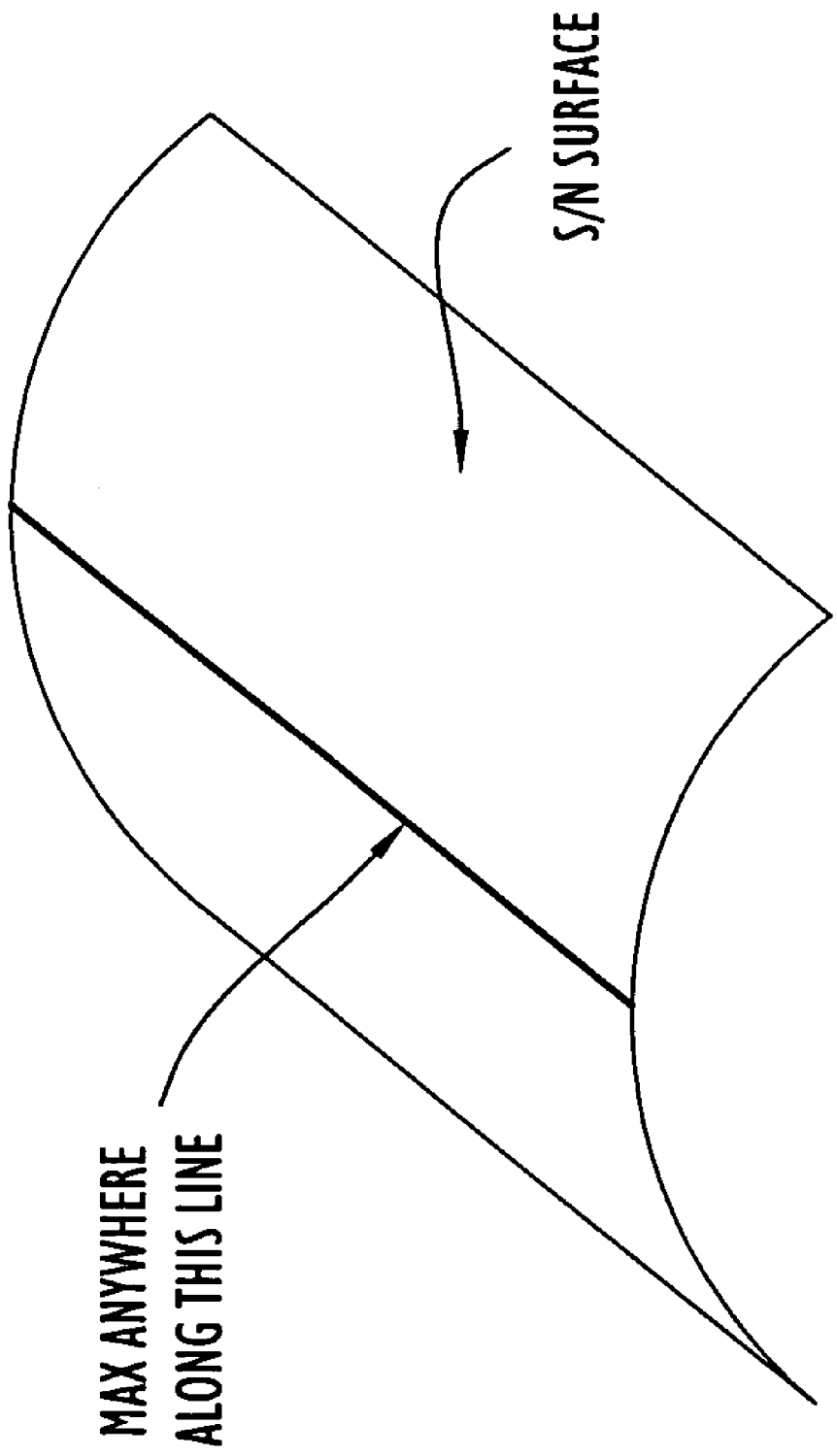
FIG. 5 is a diagram graphically depicting how to deal with a case of a singular matrix involved in the computations according to the present invention.

For any value of this second, arbitrary term, equations (2.6) are satisfied, which means that the S/N ratio has a maximum there. Thus, the maximum is not unique, and the problem can be visualized as shown in FIG. 5.

This literally puts a new dimension on the problem. To proceed, we should recognize that all these maxima are completely equivalent, and therefore it is necessary to find any one of them (i.e., any point on the line indicated on the surface shown in FIG. 5). This can be accomplished by, for example, computing the Moore-Penrose pseudoinverse of matrix $\hat{\sigma}$ (e.g., see F. R. Gantmakher: The Theory of Matrices, Vol. 1-2, Chelsea, N.Y. 1959). The pseudoinverse operator $\hat{\sigma}^+$ for operator $\hat{\sigma}$ is defined as described below.

To compute $\hat{\sigma}^+ \vec{y}$, $\vec{y}$ is split into two parts; one part lies in the subspace, where $\hat{\sigma}^{-1}$ is defined, and the other part is complementary. We apply $\hat{\sigma}^{-1}$ to the first part; but instead of adding an arbitrary vector in the complementary subspace, we set this arbitrary vector to zero (or do not add it). The result has the feature of being the smallest solution (in the Euclidian sense) of all possible solutions.

This procedure can be translated to the language of eigenvalues and eigenvectors:

All eigenvalues $\lambda_q$ and eigenvectors $\vec{e}_q$ for matrix $\hat{\sigma}$ are computed and (in the case of a singular matrix) detect one or more zero eigenvalues.
   A pseudoinverse operator $\hat{\sigma}^+$ is formed as follows:
      For each non-zero eigenvalue $\lambda_q$, the pseudoinverse operator $\hat{\sigma}^+$ shall have the same eigenvector $\vec{e}_q$ and a corresponding eigenvalue $\lambda_q^{-1}$.
      For each zero eigenvalue $\lambda_q$, the pseudoinverse operator $\hat{\sigma}^+$ shall have corresponding zero eigenvalue $\lambda_q^{-1}$.

Since all eigenvalues and eigenvectors of the pseudoinverse operator $\hat{\sigma}^+$ are defined, this procedure defines the operator itself. Now the pseudoinverse operator can be applied to compute the desired set of weights using the following formula:

$$\vec{\breve{W}}^* = \hat{\sigma}^+ \vec{y} = \sum_q \lambda_q^{-1} \cdot (\vec{y} \cdot \vec{e}_q^*) \cdot \vec{e}_q \qquad (2.9)$$

where eigenvectors are assumed to be normalized (i.e., $|\vec{e}_q|^2 = 1$), and the summation is carried over all q, which correspond to non-zero eigenvalues.

If we now use this expression in the formula for S/N (see equation (2.8)), the result is as follows:

$$\frac{|S|^2}{|N|^2} = \vec{\breve{W}}^* \vec{y}^* = \sum_q \lambda_q^{-1} \cdot (\vec{y} \cdot \vec{e}_q^*) \cdot (\vec{e}_q \cdot \vec{y}^*) = \sum_q \lambda_q^{-1} \cdot |\vec{y} \cdot \vec{e}_q^*|^2 \qquad (2.10)$$

The matrix $\hat{\sigma}$ is Hermitian (formulas for which are described hereinafter), and therefore all of its eigenvalues are real. From equation (2.10) we can see that the signal-to-noise ratio is also real.

The computation of the pseudoinverse operator looks like an illegal trick since we substitute a zero in place of $\lambda_q^{-1}$ when this quantity cannot be computed due to the zero value of $\lambda_q$. However, this so-called trick is in fact completely legitimate and accomplishes the goal of getting values of GBBF weights that produce one particular maximum for the S/N ratio.

A Case of a Nearly Singular Matrix

In the realm of numerical computation, an exact singularity presents the same problems for matrix inversion as a case when one or more of the eigenvalues is very small compared to others. The numerical solution is ill-defined, and its accuracy may suffer tremendously if small eigenvalues are encountered in matrix $\hat{\sigma}$.

Thus, the problem may conceivably arise for small, yet non-zero values of eigenvalues $\lambda_q$. In this case, a strict adherence to the above procedure would require us not to discard this eigenvalue, and its inverse $\lambda_q^{-1}$ for operator $\hat{\sigma}^+$ will be very large. Coupled with numerical round-off errors, a large contribution from $\lambda_q^{-1}$ can ruin the quality of computation for the right-hand side of equation (2.10).

Judging from the expression for the right-hand side of equation (2.10), a contribution from small $\lambda_q$ may indeed be expected to be large if vector $\vec{y}$ is selected in some arbitrary way. However, vector $\vec{y}$ is not independent of eigenvectors and eigenvalues of matrix $\hat{\sigma}$. Indeed, vector $\vec{y}$ is computed by applying matrix $\hat{A}$ to vector $\vec{x}$, and matrix $\hat{\sigma}$ is formed from matrix $\hat{A}$ too (see below for explicit expressions). It happens that whenever $\lambda_q$ is small, the large value of $\lambda_q^{-1}$ in equation (2.10) is more than compensated by a small value of $|\vec{y} \cdot \vec{e}_q^*|^2$ in the product. This curious feature allows for the treatment of small eigenvalues $\lambda_q$ in the same way as zero ones, i.e., to exclude the corresponding terms from the summation.

Computation of Vector y

The starting point is the original M-vector $\vec{x}$ at the input of the satellite antenna. Vector $\vec{y}$ is formed by applying onboard beamforming weights $A_{ij}$ as follows:

$$\vec{y} = \hat{A} \cdot \vec{x} \qquad (3.1)$$

where A is an L×M matrix.

Correlations s Between Components of Vector y

Vector $\vec{x}$ has some input noise. Each application of a weight $A_{ij}$ adds another noise component (which is dependent on the value of $A_{ij}$ itself), and finally more noise is added for each of the components of $\vec{y}$. Thus, the noise in $\vec{y}$ can be described by the following model:

$$N_k = \sum_j (A_{kj} \delta x_j + \eta(A_{kj})) + n_k \qquad (4.1)$$

where $\delta x_j$ stands for the noise component of the corresponding signal. So far, the different components of $\delta x_j$ are treated as independent. The math does not change significantly if we decide to account for correlations in $\delta x_j$.

We proceed to computing $\sigma_{ik} = \overline{N_i N_k^*}$:

$$\sigma_{kn} = \overline{|\delta x|^2} \sum_j A_{kj} A_{nj}^* + \delta_{kn} \cdot \left\{ \overline{|\eta(A_{kj})|^2} + \overline{|n_k|^2} \right\} \quad (4.2)$$

In this equation, it is assumed that noise variance for all components of x has the same value; if this assumption is not true (i.e., the M antenna elements are not identical) the resulting equation will be slightly more complex and more computationally intensive. The same is true if $\delta x_j$ are not independent. In this case, the expression for $\sigma_{kn}$ is more complex. Increased complexity in computing $\sigma_{kn}$ will have little effect on the overall complexity of the algorithm for the beamforming. Indeed, $\sigma_{kn}$ needs to be computed only once, and then used in the beamforming computation as an input.

This computation uses onboard beamforming weights $A_{kj}$ and noise figures at different stages to compute $\sigma_{kn}$. It feeds into equation (2.8).

Numerical Approach

Maximum Search

Figure 6:
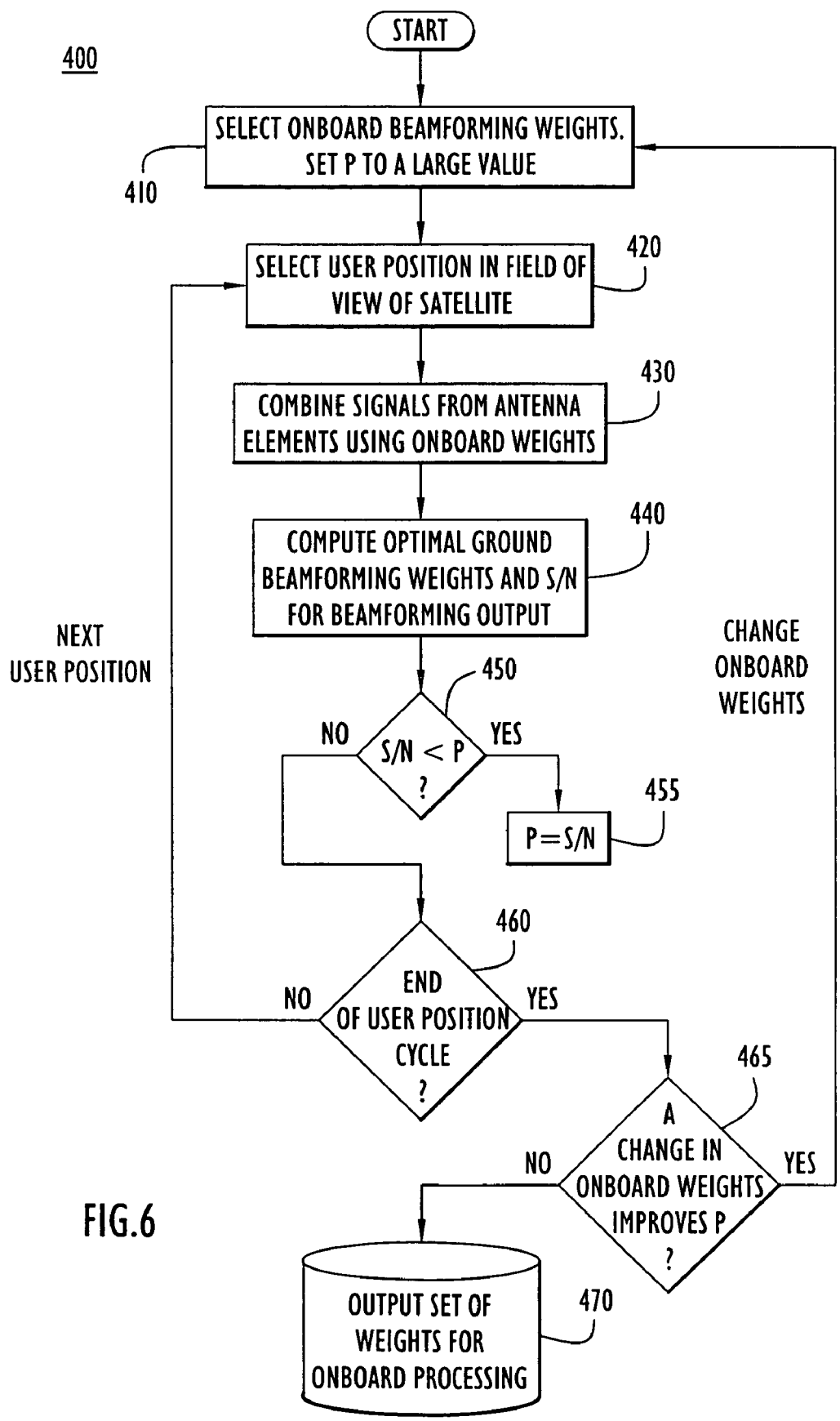
FIG. 6 is a flow chart depicting the steps according to the present invention for computing the on-board fixed beamforming weights and the variable ground-based beamforming weights according to an embodiment of the present invention.

The max/min problem described above may use commonly available numerical methods. Any numerical method requires that the goal function can be computed for any values of its arguments. In the beamforming application described above, the arguments comprise fixed onboard beamforming weights $A_{kj}$. With reference to FIG. 6, an algorithm 400 is described for computing the optimum fixed onboard beamforming weights. At 410, a set of onboard beamforming weights $A_{kj}$ is selected as the input of the goal function. The variable P denotes system S/N performance and is defined as a guaranteed or minimum S/N value for any user position. This is equivalent to defining P as the S/N for the worst (in terms of S/N) user position. At 420, a first of a plurality of (representative) user positions in the region of interest or field of view of the satellite is selected. At 430, a simulation is made for a signal received at the M plurality of antenna elements of the satellite from that user position. The corresponding M plurality of signals are combined using the fixed onboard beamforming weights set at 410 to compute for that user position the vector $\vec{y}$ using equation (3.1) and $\sigma_{kn}$ using equation (4.2). Next, at 440, the optimal ground beamforming weights and S/N are computed for the beamformed output at 430. Specifically, the matrix $\sigma_{kn}$ and $$\frac{|S|^2}{|N|^2}$$

are computed using equation (2.8) and the corresponding optimal ground-based beamforming weights W for that user position are stored. At 450, the S/N computed at that user position is compared with P and if it is less than P, then at 455 P is updated with that S/N value, essentially updating the worse S/N for the user positions cycled through to this point. Otherwise, at 460 it is determined whether all user positions have been investigated, and if not the process repeats from 420. The goal of the loop 420-460 is to find the lowest value of $$\frac{|S|^2}{|N|^2}$$

over all trial user positions.

After the user position loop is completed, then at 465, it is determined whether a change in the onboard beamforming weights can improve the current value of P. If the determination is positive at 465, then the process repeats from 410 with a new set of onboard beamforming weights. Modern multivariable optimization methods implicitly keep track of the history of changes in the optimized variable, and employ sophisticated criteria to decide if further optimization is warranted. Though these techniques are well known, one can illustrate the principle of their operation on the simplest one-dimensional optimization method, which is called the golden section optimization. In this method, the location of the maximum (or the minimum) is confined to an interval of values of the independent variable, and this interval is reduced by approximately a factor of 1.6 at each iteration. When the interval becomes small enough, the optimization ends. For constrained multivariable optimization, the principles to end optimization are more complex, but in some cases they may be viewed as an extension of those employed by the golden section method. If the determination is negative at 465, then the current set of onboard beamforming weights are selected and are fixed for use on the satellite.

The maximization algorithm takes care of modifying a set of arguments $A_{kj}$ to achieve the maximum value of the goal function. Numerical methods commonly permit imposing constraints on the arguments; for example, the absolute value of $A_{kj}$ may be limited by some upper and/or lower limit due to hardware limitations.

To summarize, the algorithm 400 involves placing test user positions in a circle; for any set of onboard weights, cycle through the test user positions; compute optimal GBBF weights and the S/N ratio at each test user position; select the worst S/N ratio from all test user positions, which defines the goal function for the optimization; and adjust the onboard weights in such way that this goal function is maximized.

For the purposes of illustrating the algorithm 400, the NASA Telecommunications and Data Relay Satellite (TDRS) is discussed below. This satellite has an array of M=32 antenna elements. The algorithm 400 combines the 32 beams in an optimal way for each user position. This means that L GBBF weights are computed separately for each user position and are generally different.

Tradeoff: Number of Channels vs. Antenna Gain

There is a tradeoff for satellite beamforming in order to balance the beamforming performance (i.e., S/N ratio) and the downlink bandwidth. Indeed, there are two limit cases in beamforming system design. At one extreme, the beamforming is done exclusively onboard the satellite and there is only one downlink signal. This option would require the least amount of downlink bandwidth, but would produce mediocre S/N performance (if the onboard beamforming weights cannot be dynamically changed). At the other extreme, all of the M receive signals are downlinked to the ground-based gateway so that the beamforming computations are performed exclusively on the ground. This would produce the best possible S/N performance but would require a large amount of downlink bandwidth. A tradeoff study investigates possible designs that are between these two opposite cases, and provides a quantitative assessment of the beamforming performance and bandwidth requirements.

In this example, there are M=32 antenna elements at the satellite. When the number of downlink channels is the same as the number of antenna elements (i.e., L=M=32), optimal S/N values are trivial to compute, and sophisticated computer methods are not required. Computational methods are required when L is less than M. Results are presented for L=10, 16, and 24 channels.

Figure 7:
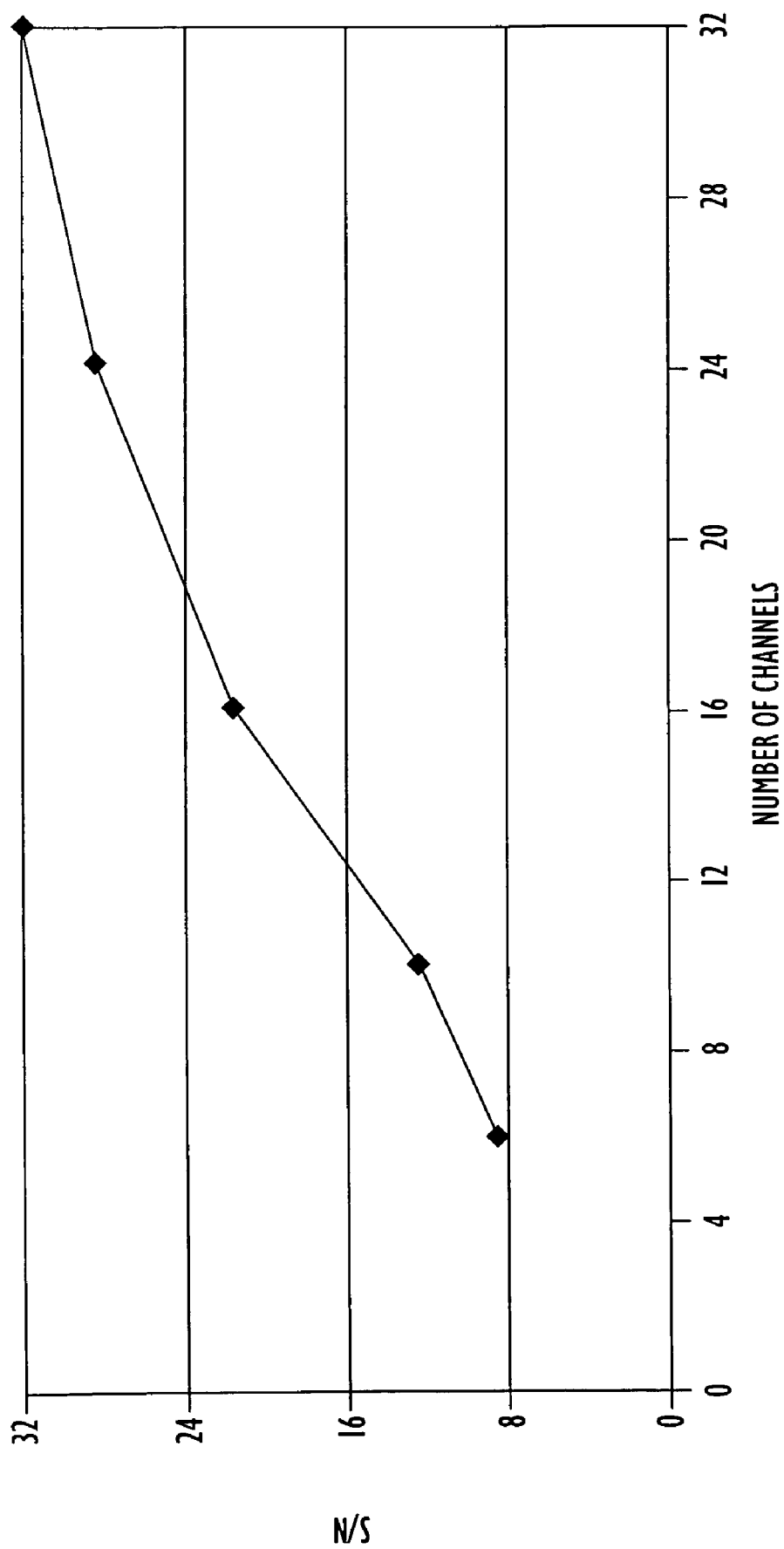
FIG. 7 is a graphical plot illustrating the signal-to-noise performance versus the number of downlink channels when the techniques according to the present invention are employed.

The S/N ratio as a function of the number L of channels is shown in FIG. 7. This diagram indicates that the design of a satellite communication system may involve a tradeoff between the number of downlink channels and the required signal-to-noise ratio. More downlink channels require more bandwidth. In turn, the required signal-to-noise ratio is related to the user data rate, which is directly proportional to the required bandwidth.

The plot in FIG. 7 shows that the number of downlink channels is a new variable available to the satellite communication system designers. The tradeoff between the number of downlink channels and the S/N ratio adds more flexibility in selecting the optimal system architecture, in order to satisfy all system requirements with lower complexity and at lower expense.

The system and methods described herein may be embodied in other specific forms without departing from the spirit or essential characteristics thereof. The foregoing embodiments are therefore to be considered in all respects illustrative and not meant to be limiting.

What is claimed is:

1. A method for communication between a satellite and a remote communication device, comprising:
   a. at the satellite:
      i. receiving a signal transmitted from the remote communication device at M plurality of antenna elements of the satellite to produce M plurality of receive signals; and
      ii. applying a set of fixed weights to the M plurality of receive signals to produce L plurality of weighted signals, where L is less than M;
      iii. transmitting the L plurality of weighted signals on corresponding ones of L downlink channels to a ground-based station;
   b. at the ground-based station:
      i. receiving the L plurality of downlink channel signals;
      ii. applying ground-based beamforming weights to the L plurality of downlink channel signals; and
      iii. combining the L plurality of weighted downlink channel signals to produce a beamformed receive signal;
   wherein for any position of the remote communication device with respect to the satellite the ground-based beamforming weights are set to values that maximize a signal-to-noise ratio of the beamformed receive signal, and the fixed weights are selected to maximize a minimum signal-to-noise ratio of the received beamformed signal with respect to position of a remote communication device.

2. The method of claim 1, and further comprising computing values for said fixed weights using an algorithm for constrained multivariable optimization.

3. The method of claim 1 and further comprising computing values for the fixed weights that yield a maximum, $$\max_{A}\left(\min_{U} \frac{S}{N} \bigg|_{W=\breve{W}}\right),$$

where the maximum is computed over all possible fixed weights A represented by an L×M matrix, the minimum is computed over all possible positions of remote communication devices U, and the signal-to-noise ratio is computed for the optimal set of ground-based beamforming weights W=W̆.

4. The method of claim 1, and further comprising selecting the number L of downlink channel to be used based on a tradeoff between the number of downlink channels and a bandwidth or signal-to-noise ratio required for the downlink channel signals.

5. A satellite communication system comprising:
   a. a satellite comprising:
      i. an antenna array having M plurality of antenna elements each of which detects a signal transmitted from each of a plurality of remote communication devices to thereby produce M plurality of receive signals for each signal transmitted from a remote communication device;
      ii. a signal processor unit that applies a set of fixed beamforming weights to the M plurality of receive signals to produce L plurality of weighted signals, where L is less than M; and
      iii. a transmitter that transmits the L plurality of weighted signals each on a corresponding downlink channel; and
   b. a ground-based station comprising:
      i. a receiver unit that receives the L plurality of downlink signals for each of the plurality remote communication devices; and
      ii. a signal processor unit that applies position-dependent beamforming weights to the L plurality of downlink signals and combines the resulting weighted downlink signals to produce a beamformed receive signal corresponding to the signal transmitted to the satellite from each of the plurality of remote communication devices, wherein the position-dependent beamforming weights are set to values that maximize a signal-to-noise ratio of the beamformed receive signal for any position of a remote communication device with respect to the satellite;
   c. and wherein the signal processor unit of the satellite applies fixed beamforming weights that maximize a minimum signal-to-noise ratio of the received beamformed signal with respect to position of a remote communication device.

6. The satellite communication system of claim 5, wherein the signal processor unit of the satellite applies the fixed beamforming weights which are derived by computing a maximum, $$\max_{A}\left(\min_{U} \frac{S}{N} \bigg|_{W=\breve{W}}\right),$$

where the maximum is computed over all possible fixed weights A represented by an L×M matrix, the minimum is computed over all possible positions of remote communication devices U, and the signal-to-noise ratio is computed for the optimal set of ground-based beamforming weights W=W̆.

7. In a satellite communication system comprising a satellite and a ground-based station, wherein the ground-based station receives L downlink signals from the satellite and applies position dependent beamforming weights to the L downlink signals to produce a beamformed receive signal corresponding to a signal transmitted to the satellite from a remote communication device, the satellite comprising:

a. an antenna array having M plurality of antenna elements, and wherein each of the plurality of antenna elements detect detects a signal transmitted from each of a plurality of remote communication devices to thereby produce M plurality of receive signals for each signal received from a remote communication device;

b. a signal processing unit that applies a set of fixed beamforming weights to the M plurality of receive signals to produce L plurality of weighted signals associated with a signal received from each of the plurality of remote communication devices, where L is less than M; and c. a transmitter that transmits the L plurality of weighted signals for each remote communication device each on a corresponding downlink channel to the ground-based station;

d. wherein the signal processor unit applies the fixed beamforming weights to the M plurality of receive signals so as to maximize a minimum signal-to-noise ratio of the beamformed receive signal with respect to a position of a remote communication device.

8. The satellite of claim 7, wherein the signal processing unit of the satellite applies the fixed beamforming weights which are derived by computing a maximum, $$\max_{A}\left(\min_{U} \frac{S}{N}\bigg|_{W=\breve{W}}\right),$$

where the maximum is computed over all possible fixed weights A represented by an L×M matrix, the minimum is computed over all possible positions of remote communication devices U, and the signal-to-noise ratio is computed for the optimal set of ground-based beamforming weights $W=\breve{W}$.

9. In a satellite communication system comprising a satellite and a ground-based station, wherein the satellite has an antenna array of M antenna elements that detects a signal transmitted from a remote communication device to produce M plurality of receive signals and applies fixed beamforming weights to the M plurality of receive signals to produce L plurality of weighted signals that are sent as L plurality of downlink signals to the ground-base station, where L is less than M, and wherein the ground-based station comprises:

a. a receiver unit that receives the L plurality of downlink signals; and b. a signal processor unit that applies position-dependent beamforming weights to the L plurality of downlink signals associated with a signal received at the satellite from each of the plurality of remote communication devices, wherein the signal processing unit combines the weighted downlink signals to produce a beamformed receive signal for each of the plurality of remote communication devices, wherein the position-dependent beamforming weights are set to values that maximize a signal-to-noise ratio of the beamformed receive signal for any position of a remote communication device with respect to the satellite.

* * * * *

UNITED STATES PATENT AND TRADEMARK OFFICE
CERTIFICATE OF CORRECTION

| | |
|---|---|
| PATENT NO. | : 7,728,766 B2 |
| APPLICATION NO. | : 11/392827 |
| DATED | : June 1, 2010 |
| INVENTOR(S) | : Alexandr Draganov et al. |

It is certified that error appears in the above-identified patent and that said Letters Patent is hereby corrected as shown below:

Column 13, line 8, replace "detect detects a signal" with -- detects a signal --.

Signed and Sealed this

Third Day of August, 2010

David J. Kappos
*Director of the United States Patent and Trademark Office*